US008892113B2

(12) United States Patent
Ratasuk et al.

(10) Patent No.: US 8,892,113 B2
(45) Date of Patent: Nov. 18, 2014

(54) COORDINATED EVACUATION OF SPECTRUM

(71) Applicant: Nokia Siemens Networks Oy, Espoo (FI)

(72) Inventors: Rapeepat Ratasuk, Hoffman Estates, IL (US); Ravindra Moorut, Tower Lakes, IL (US); Joseph Schumacher, Glen Ellyn, IL (US); James Kepler, Buffalo Grove, IL (US); Anatoly Andrianov, Schaumburg, IL (US)

(73) Assignee: Nokia Siemens Networks Oy, Espoo (FI)

( * ) Notice: Subject to any disclaimer, the term of this patent is extended or adjusted under 35 U.S.C. 154(b) by 130 days.

(21) Appl. No.: 13/706,591

(22) Filed: Dec. 6, 2012

(65) Prior Publication Data
US 2014/0162666 A1    Jun. 12, 2014

(51) Int. Cl.
*H04W 72/00* (2009.01)
*H04W 72/04* (2009.01)
*H04W 16/14* (2009.01)
*H04W 36/06* (2009.01)

(52) U.S. Cl.
CPC ...... *H04W 72/0486* (2013.01); *H04W 72/0453* (2013.01); *H04W 16/14* (2013.01); *H04W 36/06* (2013.01); *H04W 72/042* (2013.01)
USPC .......................... 455/452.2; 455/453; 455/454

(58) Field of Classification Search
CPC ..... H04W 16/04; H04W 16/10; H04W 28/02; H04W 28/08
USPC ............ 455/450, 451, 452.1, 452.2, 453, 454
See application file for complete search history.

(56) References Cited

U.S. PATENT DOCUMENTS

| 7,343,162 | B2 * | 3/2008 | Tandai et al. ................. 455/450 |
| 7,769,389 | B1 * | 8/2010 | Mangal et al. ............. 455/452.1 |
| 8,243,665 | B2 * | 8/2012 | Lee et al. ....................... 370/329 |
| 8,320,276 | B1 * | 11/2012 | Callender .................... 370/252 |
| 8,391,254 | B2 * | 3/2013 | Koo et al. ..................... 370/338 |

(Continued)

FOREIGN PATENT DOCUMENTS

| EP | 2398177 A1 | 12/2011 |
| WO | WO-2012/118740 A1 | 9/2012 |

OTHER PUBLICATIONS

Draft ETSI TR 102 907 v0.0.9 (Jan. 2011); Reconfigurable Radio Systems (RRS); Use cases for Operation in White Space Frequency Bands (54 pages).

*Primary Examiner* — Christopher M Brandt
(74) *Attorney, Agent, or Firm* — Harrington & Smith

(57) ABSTRACT

A method for coordinating spectrum evacuation is described which is useful for spectrum sharing, authorized/licensed shared access, secondary access, dynamic spectrum access, cognitive radio, general authorized access, etc. whereby access to a spectrum can be increased via buying usage right from a higher priority, primary or incumbent user, and/or via opportunistic access to unoccupied/unused spectrum. Enabling efficient spectrum evacuation guarantees limited impact to system performance while ensuring that the other user gets the spectrum back when needed. The method includes selecting a first subset of UEs for transitioning from a first bandwidth to a second bandwidth. During a first time period, the method includes, for each UE in the first subset, instructing the UE to transition using dedicated signaling. Later, during a second time period, the method includes instructing a second subset of UEs to transition using broadcast signaling. Apparatus and computer readable media are also disclosed.

20 Claims, 6 Drawing Sheets

(56) References Cited

U.S. PATENT DOCUMENTS

| | | | |
|---|---|---|---|
| 8,423,068 B2* | 4/2013 | Tiwari et al. | 455/513 |
| 8,432,930 B2* | 4/2013 | Lee et al. | 370/444 |
| 8,582,524 B2* | 11/2013 | Cho et al. | 370/329 |
| 8,630,252 B2* | 1/2014 | Cho et al. | 370/330 |
| 8,744,456 B2* | 6/2014 | Kuwahara et al. | 455/450 |
| 2002/0147020 A1* | 10/2002 | Iguchi et al. | 455/452 |
| 2003/0096619 A1* | 5/2003 | Winberg | 455/453 |
| 2007/0237103 A1* | 10/2007 | Reynolds et al. | 370/310.2 |
| 2009/0181687 A1* | 7/2009 | Tiirola et al. | 455/450 |
| 2009/0252115 A1* | 10/2009 | Breuer | 370/331 |
| 2010/0232376 A1* | 9/2010 | Wu | 370/329 |
| 2010/0248643 A1* | 9/2010 | Aaron et al. | 455/68 |
| 2010/0260056 A1* | 10/2010 | Takai et al. | 370/252 |
| 2012/0033554 A1* | 2/2012 | Shiva et al. | 370/235 |
| 2014/0094165 A1* | 4/2014 | Karlsson et al. | 455/423 |

* cited by examiner

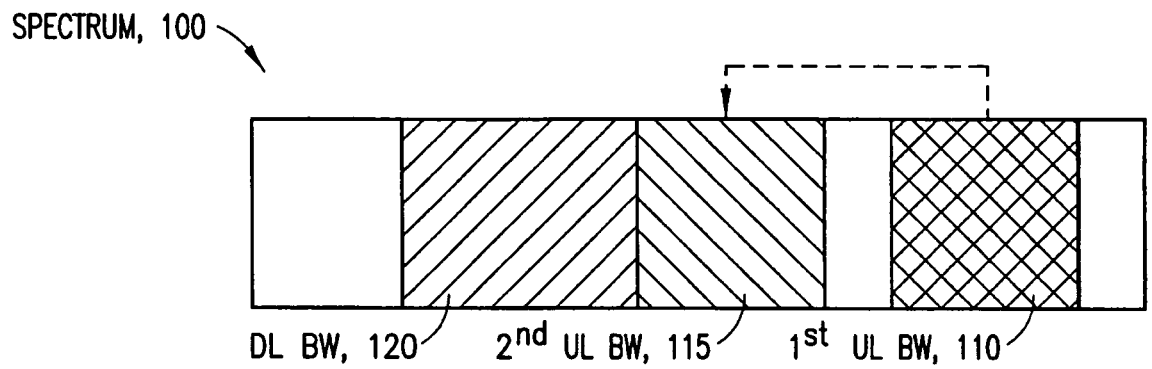

COORDINATED EVACUATION OF SPECTRUM

TECHNICAL FIELD

The exemplary and non-limiting embodiments relate generally to wireless communication systems, methods, devices and computer programs and, more specifically, relate to spectrum evacuation.

BACKGROUND

This section is intended to provide a background or context. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Multiple users may share spectrum bandwidth using various techniques, such as spectrum sharing, authorized/licensed shared access, secondary access, dynamic spectrum access, cognitive radio, general authorized access, etc. for example. These techniques allow additional users to have access to more spectrum in order to increasing their own capacity and coverage. Access may be gained by buying the usage rights of that piece of spectrum from a higher priority, primary or incumbent user or via opportunistic access to unoccupied or unused spectrum.

In the US, a portion of the federal advanced wireless services (AWS) system spectrum will become available to cellular operators on an authorized shared access (ASA) basis. Under ASA, a secondary user will share the spectrum with the federal government (the primary or incumbent user) through authorization by the primary user. When an authorization is granted, the secondary user has exclusive use of the spectrum. However, the primary user has priority access and can reacquire the spectrum as needed.

As a result, mobile network operators may share a portion of spectrum (such as an uplink (UL) bandwidth (BW) for example) with government users. When the priority users need the spectrum, the mobile network operators will clear the shared spectrum. During clearing, the mobile network operators can transition users in the shared spectrum to another portion of the spectrum (such as a second UL BW for example).

What is needed is a technique to coordinate spectrum evacuation so that the evacuation can be done quickly and efficiently without overloading the new bandwidth.

SUMMARY

The below summary section is intended to be merely exemplary and non-limiting.

The foregoing and other problems are overcome, and other advantages are realized, by the use of the exemplary embodiments.

In a first aspect thereof an exemplary embodiment provides a method for coordinating spectrum evacuation. The method includes selecting a first subset of UEs from a plurality of UEs for transitioning from a first bandwidth (such as an ASA BW for example) to a second bandwidth via dedicated signaling. The plurality of UEs includes the first subset of UEs and a second subset of UEs and the second subset of UEs includes at least one UE. During a first time period, the method includes, for each UE in the first subset of UEs, instructing the UE to transition from the first bandwidth to the second bandwidth using dedicated signaling. Dedicated signaling may, for example, be through issuing RRC (radio resource control) reconfiguration or handover messages to the UE. During a second time period, the method includes instructing the second subset of UEs to transition from the first bandwidth to the second bandwidth using broadcast signaling. The first time period precedes the second time period.

In another aspect thereof an exemplary embodiment provides an apparatus for coordinating spectrum evacuation. The apparatus includes at least one processor; and at least one memory storing computer program code. The at least one memory and the computer program code are configured to, with the at least one processor, cause the apparatus to perform actions. The actions include to select a first subset of UEs from a plurality of UEs for transitioning from a first bandwidth to a second bandwidth via dedicated signaling. The plurality of UEs includes the first subset of UEs and a second subset of UEs and the second subset of UEs includes at least one UE. During a first time period, the actions include, for each UE in the first subset of UEs, to instruct the UE to transition from the first bandwidth to the second bandwidth using dedicated signaling. During a second time period, the actions include to instruct the second subset of UEs to transition from the first bandwidth to the second bandwidth using broadcast signaling. The first time period precedes the second time period.

In a further aspect thereof an exemplary embodiment provides a computer readable medium for coordinating spectrum evacuation. The computer readable medium is tangibly encoded with a computer program executable by a processor to perform actions. The actions include selecting a first subset of UEs from a plurality of UEs for transitioning from a first bandwidth to a second bandwidth via dedicated signaling. The plurality of UEs includes the first subset of UEs and a second subset of UEs and the second subset of UEs includes at least one UE. During a first time period, the actions include, for each UE in the first subset of UEs, instructing the UE to transition from the first bandwidth to the second bandwidth using dedicated signaling. During a second time period, the actions include instructing the second subset of UEs to transition from the first bandwidth to the second bandwidth using broadcast signaling. The first time period precedes the second time period.

In another aspect thereof an exemplary embodiment provides an apparatus for coordinating spectrum evacuation. The apparatus includes means for selecting a first subset of UEs from a plurality of UEs for transitioning from a first bandwidth to a second bandwidth via dedicated signaling. The plurality of UEs includes the first subset of UEs and a second subset of UEs and the second subset of UEs includes at least one UE. The apparatus includes dedicated instructing means for instructing, for each UE in the first subset of UEs, the UE to transition from the first bandwidth to the second bandwidth using dedicated signaling during a first time period. The apparatus also includes broadcast instructing means for instructing the second subset of UEs to transition from the first bandwidth to the second bandwidth using broadcast signaling during a second time period. The first time period precedes the second time period.

BRIEF DESCRIPTION OF THE DRAWINGS

The foregoing and other aspects of exemplary embodiments are made more evident in the following Detailed Description, when read in conjunction with the attached Drawing Figures, wherein:

FIG. 1 illustrates a portion of the transmission spectrum.

FIG. 2 is a logic flow diagram that illustrates the operation of an exemplary method, and a result of execution of computer program instructions embodied on a computer readable memory, in accordance with a first exemplary embodiment.

DETAILED DESCRIPTION

Figure 3:
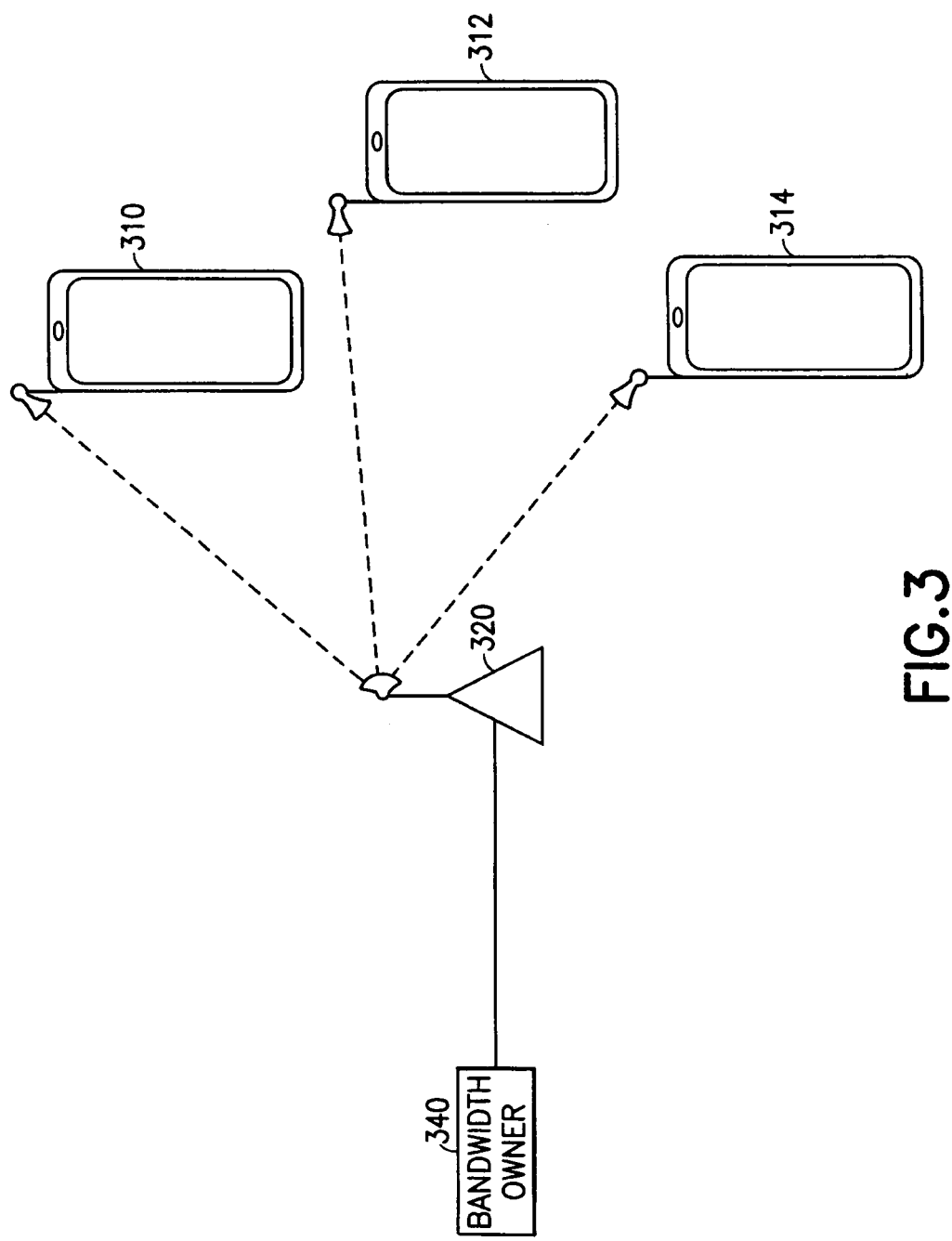
FIG. 3 demonstrates exemplary electronic devices that are suitable for use in practicing the first exemplary embodiment.

Various exemplary embodiments provide methods for fast, efficient, and orderly evacuation of a carrier (such as an UL carrier and/or a DL carrier). Various exemplary embodiments use a mixture of broadcast and UE-specific messaging to move users from the carrier being evacuated to the new carrier. Individual user may be selected for the dedicated approach versus the broadcast approach in order to transition/handover users. The amount of time and resources for the dedicated approach as compared to the broadcast approach may be decided in various exemplary embodiments. Some exemplary embodiments provide a means to ramp down of usage of a BW (such as an LTE carrier for example) during the transition.

FIG. 1 illustrates a portion of the transmission spectrum 100. The portion 100 may be divided in frequency, time and/or space into sub-sections 110, 115, 120. A sub-section 110, 115, 120 may be used for downlink (DL) transmission, such as DL BW 120, for uplink (UL) transmission, such as UL BW 110, 115, or for both.

In this example, the $1^{st}$ UL BW 110 is an ASA BW. When the system using the $1^{st}$ UL BW 110 is instructed to clear the spectrum, the system may transition UL transmissions to the $2^{nd}$ UL BW 115.

Various exemplary embodiments provide a method, apparatus and computer program(s) to coordinate spectrum evacuation.

FIG. 2 is a logic flow diagram that illustrates the operation of a method, and a result of execution of computer program instructions, in accordance with exemplary embodiments. In accordance with these exemplary embodiments a method performs, at Block 210, a step of selecting a first subset of UEs from a plurality of UEs for transitioning from a first bandwidth to a second bandwidth via dedicated signaling. The plurality of UEs comprises the first subset of UEs and a second subset of UEs and where the second subset of UEs comprises at least one UE. At Block 220, during a first time period, the method performs, for each UE in the first subset of UEs, a step of instructing the UE to transition from the first bandwidth to the second bandwidth using dedicated signaling. At Block 230, during a second time period, the method performs a step of instructing the second subset of UEs to transition from the first bandwidth to the second bandwidth using broadcast signaling. The first time period precedes the second time period.

The various blocks shown in FIG. 2 may be viewed as method steps, and/or as operations that result from operation of computer program code, and/or as a plurality of coupled logic circuit elements constructed to carry out the associated function(s).

The method may also include organizing UEs in the first subset of UEs in a prioritized order, such as based on: user profiles, UE location, QoS requirements, and/or channel conditions for example. The UEs are instructed to transition using dedicated signaling in the prioritized order. Once a given amount of time lapses, no further dedicated signaling instructions are provided (even if there are UE remaining in the first subset). The second subset of UE may then be expanded to include UE from the first subset of UE which had not been instructed to transition from the first BW to the second BW using dedicated signaling. In one, non-limiting embodiment, all UE are selected for the first set and prioritized. Then, after the time elapses, the second subset is populated with the remaining UE.

Users can be individually directed to switch carriers (such as through the "mobilityControlInfo" element in the "RRC-ConnectionReconfiguration" message or using handover messages for example). Since this message is UE-specific, it can be done quickly. On aggregate, however, this consumes a lot of resources (both downlink (DL) and UL), and also can generate more interference in the carrier as UEs must transmit acknowledgements in response to DL messages. This approach, however, may be justified depending on the number of users, time to evacuate, and prioritization.

In contrast, in a broadcast-based carrier evacuation or switching procedure, the eNB can modify system information (such as a system information block (SIB2) for example) to point to the new spectrum (such as by providing "ul-CarrierFreq", "ul-Bandwidth" and associated RACH information for the new UL carrier for example). The eNB can then modify additional information (such as the "systemInfoValueTag" in SIB1 for example) so that UEs will be notified of the changes and proceed accordingly. This broadcast method is applicable system wide and consumes no additional overhead. However, latency may be an issue (for example SIB transmissions are scheduled relatively far apart). In addition, once the system information has been acquired by the UEs, the UEs will attempt a system access on the new carrier at approximately the same time. This can lead to issues such as RACH overload and uplink capacity constraint on the new carrier.

By splitting the UEs served by an access point (such as an eNB), a first group (or subset) of UEs may be evacuated using individually directions (such as using dedicated signaling for example) and a second group of UEs may be evacuated using broadcast-based carrier evacuation (such as broadcast signaling for example). By evacuating a first group, the evacuation can be staggered so as not to overload the new carrier. In addition, UEs in the first group may maintain data or session connectivity throughout the transition. Thus, they may not suffer from data or connectivity loss. Once a sufficient number of UEs are evacuated (such as when the remaining UEs are sufficiently few that the new carrier can accommodate a mass transition for example), a broadcast-based carrier evacuation may be used in order to expedite the transition and avoid any potential latency issues.

Furthermore, the UEs may be selected for the first group in order to provide prioritized transitions. This allows UEs with specific requirements to be handled quickly before the mass transition in order to ensure the UEs are properly handled.

FIG. 3 demonstrates exemplary electronic devices that are suitable for use in practicing the first exemplary embodiment. An eNB 320 serves various UEs 310, 312, 314 using one or more BWs (such as UL BW 110/115 and DL BW 120). The eNB 320 can also receive communications from a bandwidth owner 340 (such as governmental user, for example).

Various exemplary embodiments provide techniques for fast, efficient, and orderly evacuation of a carrier. A mixture of broadcast and UE-specific messaging may be used to move users from the carrier being evacuated to the new carrier. The carrier may be an UL carrier and/or a DL carrier.

Figure 4:
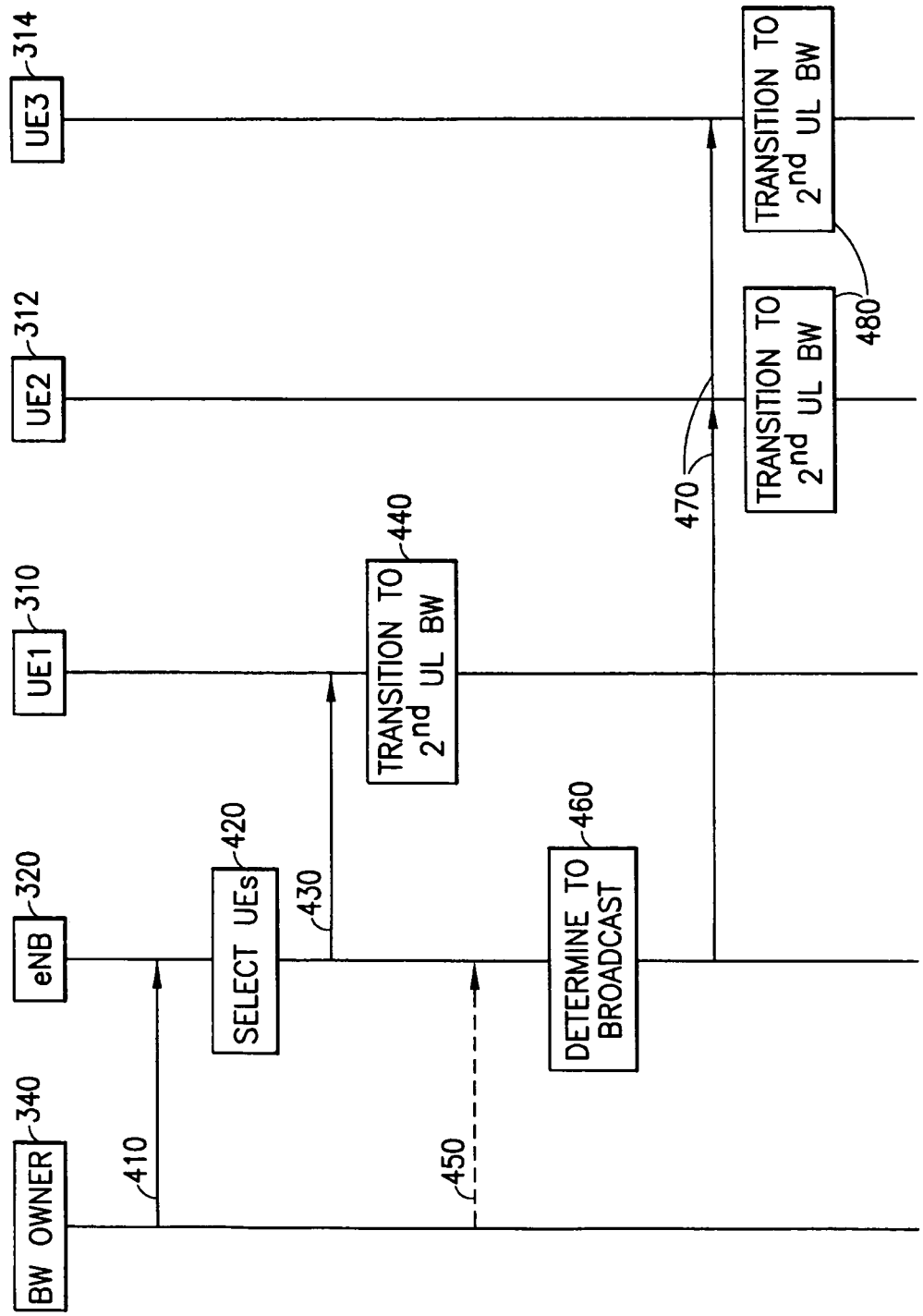
FIG. 4 is a signaling flow diagram that illustrates the operation of an exemplary method, and a result of execution of computer program instructions embodied on a computer readable memory, in accordance with the first exemplary embodiment.

FIG. 4 is a signaling flow diagram that illustrates the operation of an exemplary method, and a result of execution of computer program instructions embodied on a computer readable memory, in accordance with the first exemplary embodiment. At time 410, the BW Owner 340 instructs the eNB 320 to clear UL BW 110. In response to the instructions, the eNB 320 selects a first subset of the UEs served by the eNB 320 to be transitioned to a new BW (such as $2^{nd}$ UL BW 115 for example) using dedicated signaling. In this non-limiting embodiment, UE1 310 is selected as part of the first subset; leaving UE2 312 and UE3 314 as part of a remaining UE subset. The eNB 320 then provides instructions to the selected UEs, at time 430, and the UE1 310 transitions to the new BW at time 440.

The eNB 320 may also receive feedback (such as indications of the interference experienced for example) from the BW Owner 340. While shown as occurring at time 450, this may occur periodically and/or at any point. The eNB 320 may use this information to select additional UEs for transmission by dedicated signaling, to adjust the pace of the evacuation, etc.

At time 460, the eNB 320 determines to begin transitioning of the remaining UE subset using broadcast transmission. Then, at time 470, the eNB 320 broadcasts the transition instructions to the remaining UEs 312, 314. In accordance with these instructions, UEs 312, 314 transition to the new BW (such as $2^{nd}$ UL BW 115 for example).

In another non-limiting example, when providing instructions to multiple UEs, the eNB 320 may stagger the dedicated signaling to various UEs over a period of time or the eNB 320 may provide dedicated signaling to all selected UEs at the same time (such as by using multicast signaling for example).

Additionally, the eNB 320 waits a specific amount of time between providing UE-specific instructions at time 430 and then broadcasting reconfiguration commands (such as via SIB updates for example) to the remaining users at time 470. The eNB 320 may determine this time in advance (such as when selecting UEs at time 420). In such cases, the eNB 320 may use this determination to decide how many UEs to select for the first subset.

Furthermore, the eNB 320 may regularly evaluate the evacuation in order to determine when to broadcast the transition instructions. In one, non-limiting example, the eNB 320 evaluates whether the transition is proceeding within allowable parameters (such as those provided with the instructions to clear by the BW Owner 340 for example) and begins broadcast-based transitions accordingly. In another, non-limited example, the eNB 320 may initiate broadcast-based transitions when a threshold number of remaining UEs are present (due to dedicated signaling-based transitions and/or UE activity).

When the eNB 320 determines broadcast-based transitions are to be started (such as when a threshold number of UEs are remaining, when the transition has taken a given amount of time, etc. for example), any UEs in the first subset which have not yet been provided dedicated transition instructions are added to the second subset so that the second subset comprises all UEs remaining in the shared spectrum when broadcast-based transitions are started.

Several criteria can be used to determine which users will be transitioned through dedicated signaling. The users may be prioritized based on the amount of interference they will generate to the incumbent system. In a non-limiting example, users with active data transmission or session may be preferred. This ensures that the data session is not lost and also minimizes transmissions from active users in the spectrum BW. In another non-limiting example, preference may be given to users based on pending DL and UL data (UL data buffer obtained from the buffer status report). This preference can be further refined to favor UL data first in order to minimize UL transmissions.

In another non-limiting example, modulation and coding selection (MCS) can also be used to determine which UE should be evacuated first. Selecting based on MCS ensures that users can transition quickly and can shorten the time needed for evacuation. Preference may also be given to users based on other criteria, such as amount of data to be transmitted to/from the user, service type for the user (such as, VoIP, video, best-effort traffic, etc.), various scheduling metric, etc. for example.

Users may also be selected based on location. A user's location may be used to determine the amount of interference that will likely be generated by that user. This can also consider the user's transmission power and resource block assignments.

In another non-limiting example, users may be grouped into zones where the selection criteria are based on a zone or group number. The zone or group number may be based on various criteria, for example, geographical location. Thus, users in zone 1 may be evacuated first, followed by users in zone 2.

Figure 5:
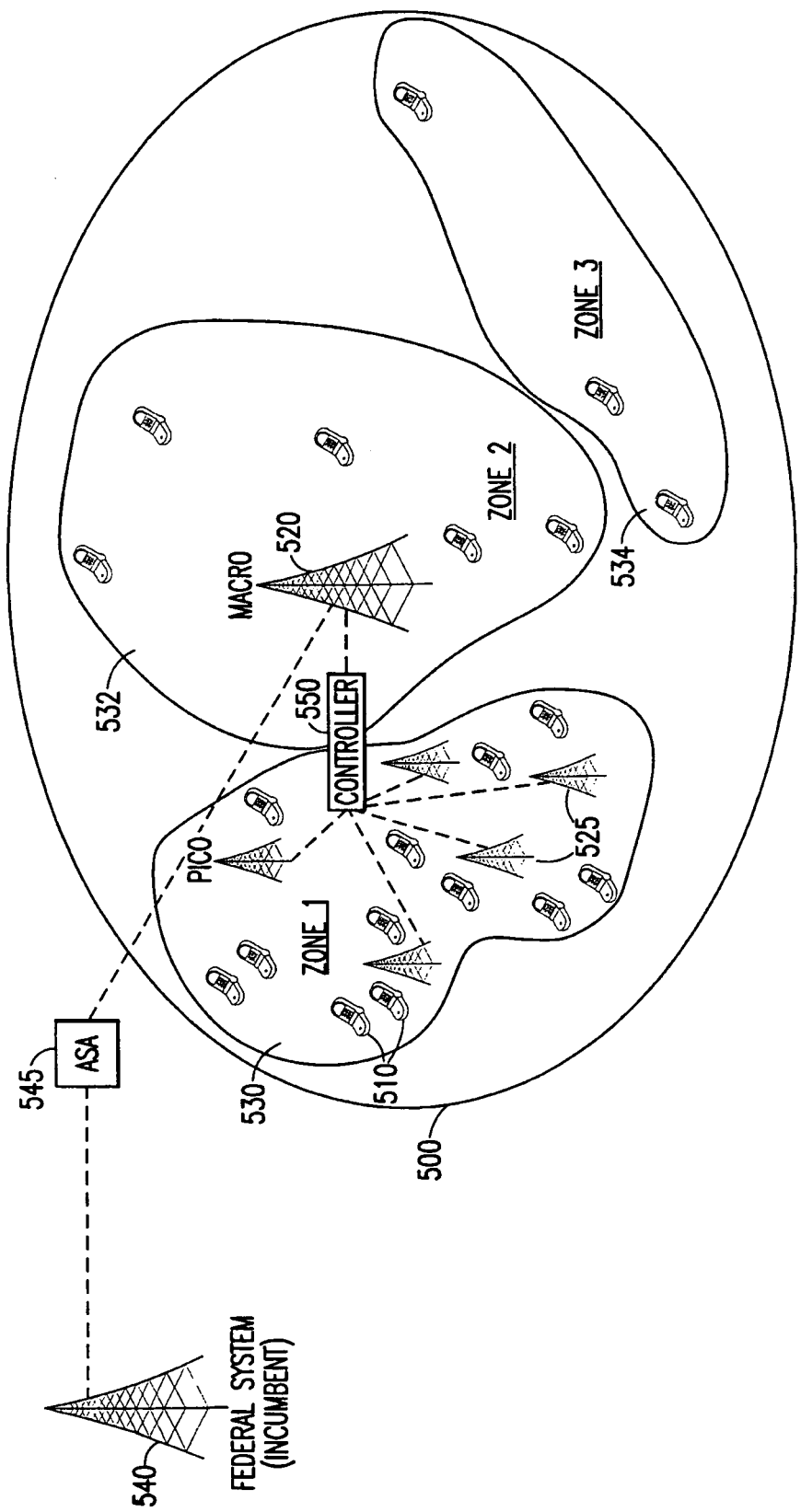
FIG. 5 demonstrates exemplary electronic devices that are suitable for use in practicing another exemplary embodiment.

FIG. 5 demonstrates exemplary electronic devices in a HetNet scenario that are suitable for use in practicing another exemplary embodiment. A macro cell 500 serves various UEs 510. The cell 500 is served by a macro eNB 520 which controls (via pico net controller 550) various pico-cells served by RRHs 525. The macro cell may be subdivided into various zones (such as zone 1 530, zone 2 532 and zone 3 534). These zones may be defined by various characteristics, such as location, proximity to BW owner controlled transmitters (such as Federal System 540), user class, etc.

In this non-limiting example, the BW owner is a Federal system 540 which communicates with the macro cell 500 via ASA server 545.

When the macro-cell receives the evacuation order from the incumbent BW owner 540 via the ASA server 545, the eNB 520 determines the ordering and zones for evacuating the UEs 510 to minimize both the potential interference to the incumbent 540 and the disruption to the new UL BW (such as an existing LTE carrier for example). In FIG. 5, the ordering is determined by the eNB 520 for all UEs 510 under its coverage. The eNB 520 can then transmit the ordering to the pico cells 525 under its control.

Further, in the non-limiting example of FIG. 5, the BW owner is described as "Federal System 540"; however, this is not intended to be limiting in any respect, as in other embodiments the entity requesting evacuation of the spectrum may be any other entity which has a superior claim to the spectrum (such as, another user with a higher priority, a primary user due to user agreements, a BW owner, etc. for example).

In another non-limiting embodiment, users may be selected based on the availability of location information. Thus, users with unknown location (such as those users without GNSS capabilities, etc. for example) may be assumed to be located in the area where they would generate the most interference to the incumbent operator and are selected for evacuation first. The users without location information may be separately grouped or assigned to an appropriate zone (such as zone 1 (530) in the example above).

In a further non-limiting embodiment, users may be selected based on transmit power, power class or other UE capability class. UEs transmitting near their maximum power rating or transmitting above a set power threshold may be evacuated first, followed by regular UEs, and followed by machine-type UEs. The user's transmission power, pathloss and resource block assignments may also be considered.

In another non-limiting embodiment, users may be selected based on any QoS requirements for the users or based on the QoS class identifier (QCI). The selection may be performed so as to continue to provide and meet the QoS requirements.

In a further non-limiting embodiment, users may be selected based on a user priority (such as a level of services based on user agreements), class of the user (such as public safety, etc.), received signal strength, etc.

UEs may also be classified based on spectrum use (such as UEs using carrier aggregation where the shared spectrum is one of a plurality of bandwidths used by the UE, etc.). These classifications may then be used to select the users.

In a further non-limiting embodiment, users may be selected based on any combination of the above criteria.

Once users are selected/prioritized, the system can determine the amount of time and resources to allocate to UE-specific handovers prior to issuing the broadcast evacuation order. Several criteria can be used to determine the amount of time and resources.

The amount of time and resources to allocate to UE-specific handovers may be based on an interference profile as specified by the incumbent BW owner. The incumbent may specify the amount of acceptable interference level as a function of time after the evacuation order is issued.

Figure 6:
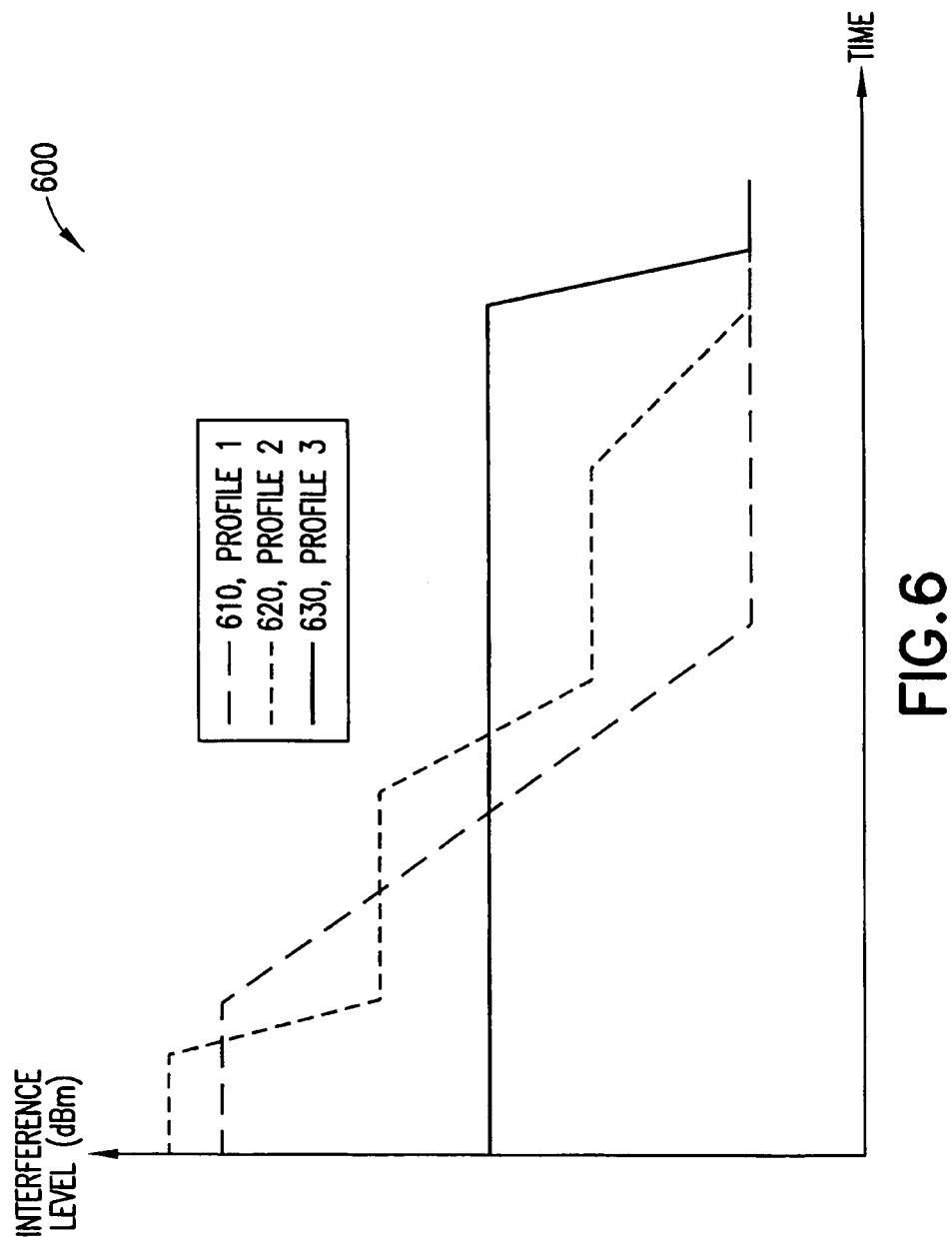
FIG. 6 shows three interference profiles in accordance with various exemplary embodiments.

FIG. 6 shows three interference profiles in accordance with various exemplary embodiments. A first profile (profile 1 610) has a gradual reduction in interference. In contrast, another profile, (profile 2 620) uses a tiered reduction. In the third profile (profile 3 630), the reduction is steep; however, it occurs over a longer period time.

Based on the profile provided by the incumbent, the eNB can estimate how much interference being generating (by the eNB and/or the UEs served by the eNB) and act accordingly, such as by issuing transition instructions in a manner that reflects the profile provided (in order to ramp down the interference generated) for example. An eNBs that is farther away from the incumbent system may delay the evacuation process for as long as possible in order not to swamp the other LTE carrier.

The eNBs estimates its interference share using various information (such as distance to incumbent (for example, given by database), UE transmission power cumulative density function (CDF) within the cell, pathloss to the incumbent (such as estimated via beacon), etc. for example).

Furthermore, the eNB can impose a maximum transmit power on any UE based on the interference profile.

During the evacuation (or ramping down time), usage of the LTE carrier can be restricted and further access to the carrier can be prohibited. This can be done in several ways, for example, by modifying system information (such as SIB2 for example) to point to the new carrier but to not yet announce the change to all users (such as by changing the value of the systemInfoValueTag in SIB1 for example). This will direct new users (such as users performing initial access for example) to use the new carrier immediately while preventing existing users from leaving the system. Once the eNB is ready, the eNB can broadcast the evacuation message to its remaining users (such as by changing the systemInfoValueTag for example).

Prior to broadcasting the evacuation command, the eNB can also temporarily increase physical random access channel (PRACH) capacity (such as by increasing the occurrences of PRACH in time for example) on the target carrier to handle the expected load.

Additionally, for some traffic types (such as best-effort traffic and delay sensitive traffic for example), the eNB can hold off (or delay) scheduling a UE until that UE has transitioned to the new carrier.

Figure 7:
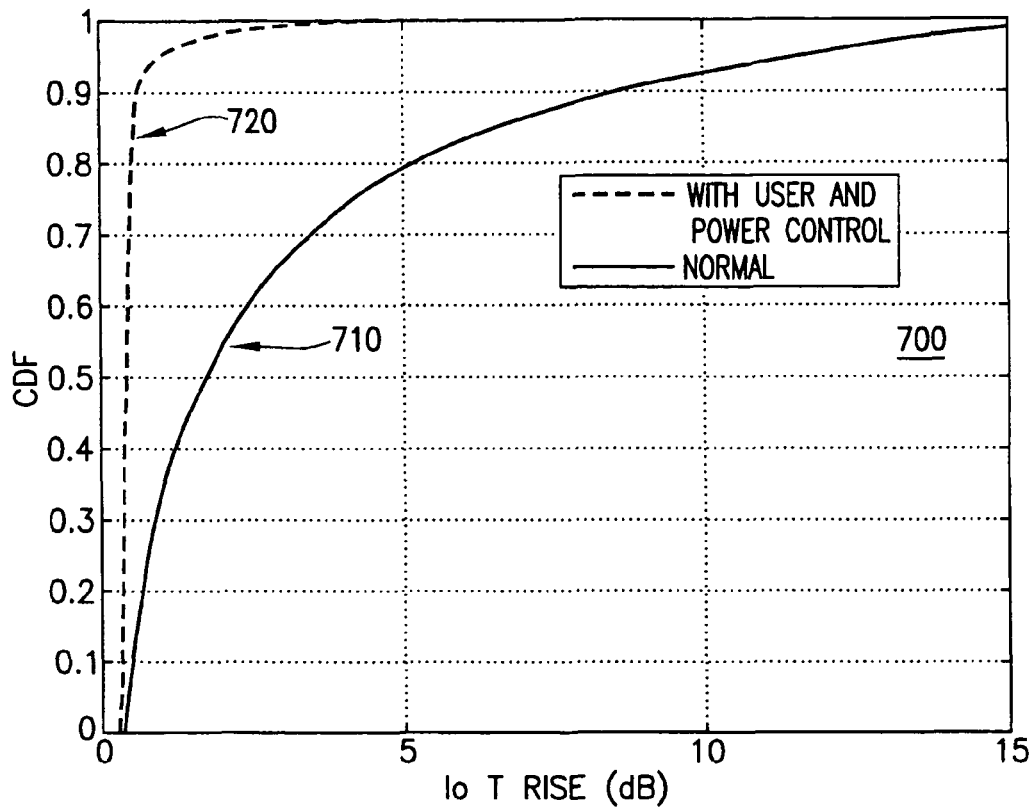
FIG. 7 is a graph showing the CDF of an IoT rise of an exemplary embodiment and a conventional technique for bandwidth evacuation.

FIG. 7 is an IoT rise vs. CDF graph comparing an exemplary embodiment to a conventional technique for bandwidth evacuation. Using the conventional ('normal') techniques (such as by individually directing each UE separately) the IoT rise acts as curve 710. In comparison, using an exemplary embodiment (where user and power control are used) creates an IoT rise such as shown in curve 720. As shown, user and power control provide a quick and efficient technique to evacuate the BW. Thus, the IoT can be significantly reduced and confined to a narrow range using an exemplary embodiment. This limits the interference to the incumbent system and prevents an uncontrolled and large rise in interference as well.

Figure 8:
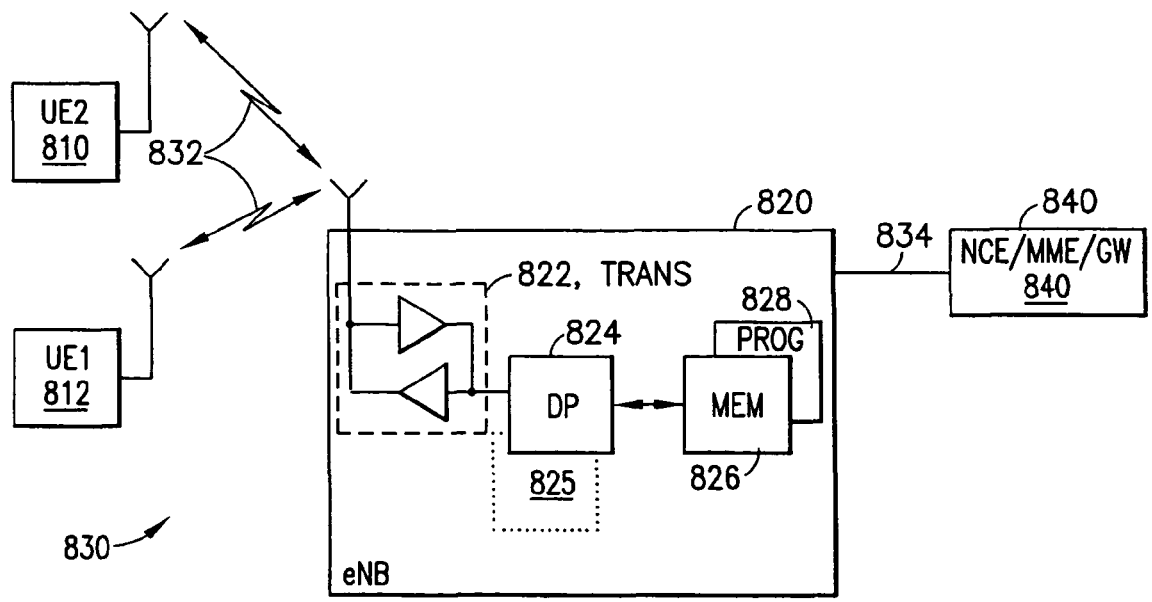
FIG. 8 shows a simplified block diagram of exemplary electronic devices that are suitable for use in practicing various exemplary embodiments.

Reference is made to FIG. 8 for illustrating a simplified block diagram of various electronic devices and apparatus that are suitable for use in practicing exemplary embodiments.

In the wireless system 830 of FIG. 8, a wireless network is adapted for communication over a wireless link 832 with various apparatus, such as a mobile communication devices which may be referred to as a UE 810, 812, via a network access node, such as a Node B (base station), and more specifically an eNB 820. The network may include a network control element (NCE) 840 that may include the MME/SGW functionality and may include functionality to relay instructions from a bandwidth owner.

The eNB 820 also includes a controller, such as a computer or a data processor (DP) 824, a computer-readable memory medium embodied as a memory (MEM) 826 that stores a program of computer instructions (PROG) 828, and a suitable wireless interface, such as RF transceiver 822, for communication with the UE 810, 812 via one or more antennas. The eNB 820 is coupled via a data/control path 834 to the NCE 840. The path 834 may be implemented as an S1 interface.

The PROG 828 is assumed to include program instructions that, when executed by the associated DP, enable the device to operate in accordance with exemplary embodiments, as will be discussed below in greater detail.

That is, various exemplary embodiments may be implemented at least in part by computer software executable by the DP 824 of the eNB 820, or by hardware, or by a combination of software and hardware (and firmware).

The UE the eNB 820 may also include dedicated processors, for example, spectrum evacuation coordinator 825.

In general, the various embodiments of the UE 810 can include, but are not limited to, cellular telephones, tablets having wireless communication capabilities, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The computer readable MEM 826 may be of any type suitable to the local technical environment and may be implemented using any suitable data storage technology, such as semiconductor based memory devices, flash memory, magnetic memory devices and systems, optical memory devices and systems, fixed memory and removable memory. The DP 824 may be of any type suitable to the local technical environment, and may include one or more of general purpose computers, special purpose computers, microprocessors, digital signal processors (DSPs) and processors based on a multicore processor architecture, as non-limiting examples. The wireless interface (e.g., RF transceiver 822) may be of any type suitable to the local technical environment and may be implemented using any suitable communication technology such as individual transmitters, receivers, transceivers or a combination of such components.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although not limited thereto. While various aspects of the exemplary embodiments may be illustrated and described as block diagrams, flow charts, or using some other pictorial representation, it is well understood that these blocks, apparatus, systems, techniques or methods described herein may be implemented in, as nonlimiting examples, hardware, software, firmware, special purpose circuits or logic, general purpose hardware or controller or other computing devices, or some combination thereof.

It should thus be appreciated that at least some aspects of the exemplary embodiments may be practiced in various components such as integrated circuit chips and modules, and that the exemplary embodiments may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments.

Various modifications and adaptations to the foregoing exemplary embodiments may become apparent to those skilled in the relevant arts in view of the foregoing description, when read in conjunction with the accompanying drawings. However, any and all modifications will still fall within the scope of the non-limiting and exemplary embodiments.

An exemplary embodiment provides a method for coordinating spectrum evacuation. The method includes selecting a first subset of UEs from a plurality of UEs for transitioning from a first bandwidth to a second bandwidth via dedicated signaling. The plurality of UEs includes the first subset of UEs and a second subset of UEs and the second subset of UEs includes at least one UE. During a first time period, the method includes, for each UE in the first subset of UEs, instructing the UE to transition from the first bandwidth to the second bandwidth using dedicated signaling. During a second time period, the method includes instructing the second subset of UEs to transition from the first bandwidth to the second bandwidth using broadcast signaling. The first time period precedes the second time period.

In another exemplary embodiment of the method above, the method also includes receiving instructions to clear the first bandwidth. Selecting the first subset of UEs is performed in response to receiving the instructions. The instructions to clear the first bandwidth may include an indication of an interference profile. The interference profile indicates acceptable interference as a function of time.

In a further exemplary embodiment of any one of the methods above, instructing a UE to transition from the first bandwidth to the second bandwidth using dedicated signaling includes transmitting a reconfiguration command to the UE and receiving an ACK/NACK message from the UE.

In another exemplary embodiment of any one of the methods above, instructing the second subset of UEs to transition from the first bandwidth to the second bandwidth using broadcast signaling includes: at a first time, modifying a first system information block to provide information regarding the second bandwidth; at a second time, changing a system information value tag in a second system information block to indicate a change in the first system information block; and broadcasting the second system information block.

In a further exemplary embodiment of any one of the methods above, the method also includes determining time and resources for the dedicated signaling. The determination may be based at least in part on: an interference profile, a total number of UE, and/or an indication of interference in the first bandwidth.

In another exemplary embodiment of any one of the methods above, a UE is selected as part of the first subset of UEs from the plurality of UEs based at least in part on: whether the UE has an active session; whether the UE has an uplink session; whether the UE has an downlink session; a location of the UE; whether location information of the UE is available; and/or quality of service requirements for the UE.

In a further exemplary embodiment of any one of the methods above, the method also includes organizing UEs in the first subset of UEs in a prioritized order. The prioritized order may be based on: user profiles, UE location, QoS requirements, and/or channel conditions. Instructing a given UE to transition from the first BW to the second BW using dedicated signaling may include: instructing the individual user equipment to transition from the first bandwidth to the second bandwidth using dedicated signaling in the prioritized order; and after a predetermined time lapses, ceasing instructing the individual user equipment to transition from the first bandwidth to the second bandwidth using dedicated signaling. The second subset of UE may include UE from the first subset of UE which had not been instructed to transition from the first BW to the second BW using dedicated signaling.

In another exemplary embodiment of any one of the methods above, the method also includes increasing random access resources for the second bandwidth prior to the second time period.

A further exemplary embodiment provides an apparatus for coordinating spectrum evacuation. The apparatus includes at least one processor; and at least one memory storing computer program code. The at least one memory and the computer program code are configured to, with the at least one processor, cause the apparatus to perform actions. The actions include to select a first subset of UEs from a plurality of UEs for transitioning from a first bandwidth to a second bandwidth via dedicated signaling. The plurality of UEs includes the first subset of UEs and a second subset of UEs and the second subset of UEs includes at least one UE. During a first time period, the actions include, for each UE in the first subset of UEs, to instruct the UE to transition from the first bandwidth to the second bandwidth using dedicated signaling. During a second time period, the actions include to instruct the second subset of UEs to transition from the first bandwidth to the second bandwidth using broadcast signaling. The first time period precedes the second time period.

In another exemplary embodiment of the apparatus above, the actions also include to receive instructions to clear the first bandwidth. Selecting the first subset of UEs is performed in response to receiving the instructions. The instructions to clear the first bandwidth may include an indication of an interference profile. The interference profile indicates acceptable interference as a function of time.

In a further exemplary embodiment of any one of the apparatus above, when instructing a UE to transition from the first bandwidth to the second bandwidth using dedicated signaling, the actions include to transmit a reconfiguration command to the UE and to receive an ACK/NACK message from the UE.

In another exemplary embodiment of any one of the apparatus above, when instructing the second subset of UEs to transition from the first bandwidth to the second bandwidth using broadcast signaling the actions include: at a first time, to modify a first system information block to provide information regarding the second bandwidth; at a second time, to change a system information value tag in a second system information block to indicate a change in the first system information block; and to broadcast the second system information block.

In a further exemplary embodiment of any one of the apparatus above, the actions also include to determine time and resources for the dedicated signaling. The determination may be based at least in part on: an interference profile, a total number of UE, and/or an indication of interference in the first bandwidth.

In another exemplary embodiment of any one of the apparatus above, a UE is selected as part of the first subset of UEs from the plurality of UEs based at least in part on: whether the UE has an active session; whether the UE has an uplink session; whether the UE has an downlink session; a location of the UE; whether location information of the UE is available; and/or quality of service requirements for the UE.

In a further exemplary embodiment of any one of the apparatus above, the actions also include to organize UEs in the first subset of UEs in a prioritized order. The prioritized order may be based on: user profiles, UE location, QoS requirements, and/or channel conditions. Instructing a given UE to transition from the first BW to the second BW using dedicated signaling may include: to instruct the individual user equipment to transition from the first bandwidth to the second bandwidth using dedicated signaling in the prioritized order; and after a predetermined time lapses, to cease instructing the individual user equipment to transition from the first bandwidth to the second bandwidth using dedicated signaling. The second subset of UE may include UE from the first subset of UE which had not been instructed to transition from the first BW to the second BW using dedicated signaling.

In another exemplary embodiment of any one of the apparatus above, the actions also include to increase random access resources for the second bandwidth prior to the second time period.

In a further exemplary embodiment of any one of the apparatus above, the apparatus is embodied in an integrated circuit.

In another exemplary embodiment of any one of the apparatus above, the apparatus is embodied in a basestation.

A further exemplary embodiment provides a computer readable medium for coordinating spectrum evacuation. The computer readable medium is tangibly encoded with a computer program executable by a processor to perform actions. The actions include selecting a first subset of UEs from a plurality of UEs for transitioning from a first bandwidth to a second bandwidth via dedicated signaling. The plurality of UEs includes the first subset of UEs and a second subset of UEs and the second subset of UEs includes at least one UE. During a first time period, the actions include, for each UE in the first subset of UEs, instructing the UE to transition from the first bandwidth to the second bandwidth using dedicated signaling. During a second time period, the actions include instructing the second subset of UEs to transition from the first bandwidth to the second bandwidth using broadcast signaling. The first time period precedes the second time period.

In another exemplary embodiment of the computer readable medium above, the actions also include receiving instructions to clear the first bandwidth. Selecting the first subset of UEs is performed in response to receiving the instructions. The instructions to clear the first bandwidth may include an indication of an interference profile. The interference profile indicates acceptable interference as a function of time.

In a further exemplary embodiment of any one of the computer readable media above, instructing a UE to transition from the first bandwidth to the second bandwidth using dedicated signaling includes transmitting a reconfiguration command to the UE and receiving an ACK/NACK message from the UE.

In another exemplary embodiment of any one of the computer readable media above, instructing the second subset of UEs to transition from the first bandwidth to the second bandwidth using broadcast signaling includes: at a first time, modifying a first system information block to provide information regarding the second bandwidth; at a second time, changing a system information value tag in a second system information block to indicate a change in the first system information block; and broadcasting the second system information block.

In a further exemplary embodiment of any one of the computer readable media above, the actions also include determining time and resources for the dedicated signaling. The determination may be based at least in part on: an interference profile, a total number of UE, and/or an indication of interference in the first bandwidth.

In another exemplary embodiment of any one of the computer readable media above, a UE is selected as part of the first subset of UEs from the plurality of UEs based at least in part on: whether the UE has an active session; whether the UE has an uplink session; whether the UE has an downlink session; a location of the UE; whether location information of the UE is available; and/or quality of service requirements for the UE.

In a further exemplary embodiment of any one of the computer readable media above, the actions also include organizing UEs in the first subset of UEs in a prioritized order. The prioritized order may be based on: user profiles, UE location, QoS requirements, and/or channel conditions. Instructing a given UE to transition from the first BW to the second BW using dedicated signaling may include: instructing the individual user equipment to transition from the first bandwidth to the second bandwidth using dedicated signaling in the prioritized order; and after a predetermined time lapses, ceasing instructing the individual user equipment to transition from the first bandwidth to the second bandwidth using dedicated signaling. The second subset of UE may include UE from the first subset of UE which had not been instructed to transition from the first BW to the second BW using dedicated signaling.

In another exemplary embodiment of any one of the computer readable media above, the actions also include increasing random access resources for the second bandwidth prior to the second time period.

In a further exemplary embodiment of any one of the computer readable media above, the computer readable medium is a storage medium.

In another exemplary embodiment of any one of the computer readable media above, the computer readable medium is a non-transitory computer readable medium (e.g., CD-ROM, RAM, flash memory, etc.).

A further exemplary embodiment provides an apparatus for coordinating spectrum evacuation. The apparatus includes means for selecting a first subset of UEs from a plurality of UEs for transitioning from a first bandwidth to a second bandwidth via dedicated signaling. The plurality of UEs includes the first subset of UEs and a second subset of UEs and the second subset of UEs includes at least one UE. The apparatus includes dedicated instructing means for instructing, for each UE in the first subset of UEs, the UE to transition from the first bandwidth to the second bandwidth using dedicated signaling during a first time period. The apparatus also includes broadcast instructing means for instructing the second subset of UEs to transition from the first bandwidth to the second bandwidth using broadcast signaling during a second time period. The first time period precedes the second time period.

In another exemplary embodiment of the apparatus above, the apparatus also includes means for receiving instructions to clear the first bandwidth. Selecting the first subset of UEs is performed in response to receiving the instructions. The instructions to clear the first bandwidth may include an indication of an interference profile. The interference profile indicates acceptable interference as a function of time.

In a further exemplary embodiment of any one of the apparatus above, the dedicated instructing means includes means for transmitting a reconfiguration command to the UE and receiving an ACK/NACK message from the UE.

In another exemplary embodiment of any one of the apparatus above, the broadcast instructing means includes: means for modifying a first system information block to provide information regarding the second bandwidth at a first time; means for changing a system information value tag in a second system information block to indicate a change in the first system information block at a second time; and means for broadcasting the second system information block.

In a further exemplary embodiment of any one of the apparatus above, the apparatus also includes means for determining time and resources for the dedicated signaling. The determination may be based at least in part on: an interference profile, a total number of UE, and/or an indication of interference in the first bandwidth.

In another exemplary embodiment of any one of the apparatus above, a UE is selected as part of the first subset of UEs from the plurality of UEs based at least in part on: whether the UE has an active session; whether the UE has an uplink session; whether the UE has an downlink session; a location of the UE; whether location information of the UE is available; and/or quality of service requirements for the UE.

In a further exemplary embodiment of any one of the apparatus above, the apparatus also includes means for organizing UEs in the first subset of UEs in a prioritized order. The prioritized order may be based on: user profiles, UE location, QoS requirements, and/or channel conditions. The dedicated instructing means may include means for instructing the individual user equipment to transition from the first bandwidth to the second bandwidth using dedicated signaling in the prioritized order; and means for ceasing instructing the individual user equipment to transition from the first bandwidth to the second bandwidth using dedicated signaling after a predetermined time lapses. The second subset of UE may include UE from the first subset of UE which had not been instructed to transition from the first BW to the second BW using dedicated signaling.

In another exemplary embodiment of any one of the apparatus above, the apparatus also includes means for increasing random access resources for the second bandwidth prior to the second time period.

For example, while the exemplary embodiments have been described above in the context of the E-UTRAN (UTRAN-LTE) system, it should be appreciated that the exemplary embodiments are not limited for use with only this one particular type of wireless communication system, and that they may be used to advantage in other wireless communication systems such as for example (WLAN, UTRAN, GSM as appropriate).

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Further, the various names used for the described parameters (e.g., SIB1, SIB2, etc.) are not intended to be limiting in any respect, as these parameters may be identified by any suitable names. Further, the various names assigned to different channels (e.g., RACH, PRACH, etc.) are not intended to be limiting in any respect, as these various channels may be identified by any suitable names.

Furthermore, some of the features of the various non-limiting and exemplary embodiments may be used to advantage without the corresponding use of other features. As such, the foregoing description should be considered as merely illustrative of the principles, teachings and exemplary embodiments, and not in limitation thereof.

The following abbreviations that may be found in the specification and/or the drawing figures are defined as follows:

3GPP third generation partnership project
   ACK acknowledge
   ASA authorized shared access
   AWS advanced wireless services
   BW bandwidth
   CDF cumulative density function
   DL downlink (eNB towards UE)
   eNB E-UTRAN Node B (evolved Node B)
   E-UTRAN evolved UTRAN (LTE)
   GNSS global navigation satellite system
   IoT interference over thermal noise
   LTE long term evolution of UTRAN (E-UTRAN)
   MCS modulation and coding selection
   NACK not acknowledge/negative acknowledge
   Node B base station PHY physical (layer 1, L1)
PRACH physical random access channel
QCI QoS class identifier
QoS quality of service
RACH random access channel
RRC radio resource control
RRH remote radio head
SIB system information block
UE user equipment, such as a mobile station or mobile terminal
UL uplink (UE towards eNB)
UTRAN universal terrestrial radio access network

What is claimed is:

1. A method comprising:
selecting a first subset of user equipment from a plurality of user equipment for transitioning from a first bandwidth to a second bandwidth via dedicated signaling;
during a first time period, for individual user equipment in the first subset of user equipment, instructing the individual user equipment to transition from the first bandwidth to the second bandwidth using dedicated signaling; and
during a second time period, instructing a second subset of user equipment to transition from the first bandwidth to the second bandwidth using broadcast signaling,
where the second subset of user equipment comprises at least one user equipment and
where the first time period precedes the second time period.

2. The method of claim 1, further comprising receiving instructions to clear the first bandwidth, where selecting the first subset of user equipment is performed in response to receiving the instructions.

3. The method of claim 2, where the instructions to clear the first bandwidth comprise an indication of an interference profile, where the interference profile indicates acceptable interference as a function of time.

4. The method of claim 1, where instructing a given user equipment to transition from the first bandwidth to the second bandwidth using dedicated signaling comprises: transmitting a reconfiguration command to the given user equipment and receiving an acknowledgement/negative-acknowledgement message from the given user equipment.

5. The method of claim 1, where instructing the second subset of user equipment to transition from the first bandwidth to the second bandwidth using broadcast signaling comprises:
at a first time, modifying a first system information block to provide information regarding the second bandwidth;
at a second time, changing a system information value tag in a second system information block to indicate a change in the first system information block; and
broadcasting the second system information block.

6. The method of claim 1, further comprising determining time and resources for the dedicated signaling in order to ramp down interference on the first bandwidth.

7. The method of claim 6, where the determination is based at least in part on at least one of an interference profile, a total number of user equipment, and an indication of interference in the first bandwidth.

8. The method of claim 1, where a given user equipment is selected as part of the first subset of user equipment from the plurality of user equipment based at least in part on at least one of: whether the given user equipment has an active session; whether the given user equipment has an uplink session; whether the given user equipment has an downlink session; a location of the given user equipment; whether location information of the given user equipment is available; and quality of service requirements for the given user equipment.

9. The method of claim 1, further comprising organizing user equipment in the first subset of user equipment in a prioritized order.

10. The method of claim 9, where instructing a given user equipment to transition from the first bandwidth to the second bandwidth using dedicated signaling comprises:
instructing the individual user equipment to transition from the first bandwidth to the second bandwidth using dedicated signaling in the prioritized order; and
after a given amount of time lapses, ceasing instructing the individual user equipment to transition from the first bandwidth to the second bandwidth using dedicated signaling,
where the second subset of user equipment comprises user equipment from the first subset of user equipment which had not been instructed to transition from the first bandwidth to the second bandwidth using dedicated signaling.

11. An apparatus comprising:
at least one processor; and
at least one memory including computer program code, the at least one memory and the computer program code configured to, with the at least one processor, cause the apparatus to perform at least the following:
to select a first subset of user equipment from a plurality of user equipment for transitioning from a first bandwidth to a second bandwidth via dedicated signaling;
during a first time period, for each individual user equipment in the first subset of user equipment, to instruct the individual user equipment to transition from the first bandwidth to the second bandwidth using dedicated signaling; and
during a second time period, to instruct a second subset of user equipment to transition from the first bandwidth to the second bandwidth using broadcast signaling,
where the second subset of user equipment comprises at least one user equipment and
where the first time period precedes the second time period.

12. The apparatus of claim 11, where the at least one memory and the computer program code are further configured to cause the apparatus to receive instructions to clear the first bandwidth, where selecting the first subset of user equipment is performed in response to receiving the instructions.

13. The apparatus of claim 11, where, when instructing a given user equipment to transition from the first bandwidth to the second bandwidth using dedicated signaling, the at least one memory and the computer program code are further configured to cause the apparatus to transmit a reconfiguration command to the given user equipment and to receive an acknowledgement/negative-acknowledgement message from the given user equipment.

14. The apparatus of claim 11, where, when instructing the second subset of user equipment to transition from the first bandwidth to the second bandwidth using broadcast signaling, the at least one memory and the computer program code are further configured to cause the apparatus:
at a first time, to modify a first system information block to provide information regarding the second bandwidth;
at a second time, to change a system information value tag in a second system information block to indicate a change in the first system information block; and
broadcasting the second system information block.

15. The apparatus of claim 11, where the at least one memory and the computer program code are further configured to cause the apparatus to determine time and resources for the dedicated signaling.

16. A non-transitory computer readable medium tangibly encoded with a computer program executable by a processor to perform actions comprising:
- selecting a first subset of user equipment from a plurality of user equipment for transitioning from a first bandwidth to a second bandwidth via dedicated signaling;
- during a first time period, for each individual user equipment in the first subset of user equipment, instructing the individual user equipment to transition from the first bandwidth to the second bandwidth using dedicated signaling; and
- during a second time period, instructing a second subset of user equipment to transition from the first bandwidth to the second bandwidth using broadcast signaling,
- where the second subset of user equipment comprises at least one user equipment and
- where the first time period precedes the second time period.

17. The non-transitory computer readable medium of claim 16, where instructing a given user equipment to transition from the first bandwidth to the second bandwidth using dedicated signaling comprises transmitting a reconfiguration command to the given user equipment and receiving an acknowledgement/negative-acknowledgement message from the given user equipment.

18. The non-transitory computer readable medium of claim 16, where instructing the second subset of user equipment to transition from the first bandwidth to the second bandwidth using broadcast signaling comprises:
- at a first time, modifying a first system information block to provide information regarding the second bandwidth;
- at a second time, changing a system information value tag in a second system information block to indicate a change in the first system information block; and
- broadcasting the second system information block.

19. An apparatus comprising:
- means for selecting a first subset of user equipment from a plurality of user equipment for transitioning from a first bandwidth to a second bandwidth via dedicated signaling;
- dedicated instructing means for instructing, for each individual user equipment in the first subset of user equipment, the individual user equipment to transition from the first bandwidth to the second bandwidth using dedicated signaling during a first time period; and
- broadcast instructing means for instructing a second subset of user equipment to transition from the first bandwidth to the second bandwidth using broadcast signaling during a second time period,
- where the second subset of user equipment comprises at least one user equipment and
- where the first time period precedes the second time period.

20. The apparatus of claim 19, the dedicated instructing means comprises means for transmitting a reconfiguration command to the user equipment; and
- where the apparatus further comprises means for receiving an acknowledgement/negative-acknowledgement message from the user equipment.

* * * * *